United States Patent
Enomoto (10) Patent No.: US 6,584,287 B2
(45) Date of Patent: Jun. 24, 2003

(54) CAMERA AND IMAGE FORMING SYSTEM USING THE CAMERA

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/978,706

(22) Filed: Oct. 18, 2001

(65) Prior Publication Data

US 2002/0051639 A1 May 2, 2002

(30) Foreign Application Priority Data

Oct. 18, 2000 (JP) ........................................ 2000-317901

(51) Int. Cl.⁷ .......................... G03B 17/24; G03B 27/52
(52) U.S. Cl. ....................... 396/311; 396/315; 396/319; 355/40
(58) Field of Search ................................ 396/310, 311, 396/315, 316, 317, 318, 319, 320, 321, 429, 211; 355/40, 41; 348/247, 552

(56) References Cited

U.S. PATENT DOCUMENTS

| | | | | |
|---|---|---|---|---|
| 5,461,440 A | * | 10/1995 | Toyoda et al. | ............... 396/311 |
| 5,606,365 A | * | 2/1997 | Maurinus et al. | ......... 348/222.1 |
| 5,739,924 A | * | 4/1998 | Sano | ........................... 358/487 |
| 5,799,219 A | * | 8/1998 | Moghadam et al. | ......... 396/319 |
| 5,917,578 A | * | 6/1999 | Nakamura | .................... 355/40 |
| 6,219,446 B1 | * | 4/2001 | Kiriki et al. | ................ 382/167 |
| 6,324,345 B1 | | 11/2001 | Enomoto | |

FOREIGN PATENT DOCUMENTS

| | | |
|---|---|---|
| JP | 04-342241 | 11/1992 |
| JP | 06-237376 | 8/1994 |
| JP | 09-281613 | 10/1997 |
| JP | 11-231465 | 8/1999 |

* cited by examiner

*Primary Examiner*—Alan A. Mathews
(74) *Attorney, Agent, or Firm*—Birch, Stewart, Kolasch & Birch, LLP (57) ABSTRACT

A camera is used for recording information related to deterioration of image used for image processing in at least one selected from a photographic film, a film cartridge and a recording medium, provided with an information specifying unit which specifies at least one of image quality deterioration information related to image quality deterioration of the photographic image caused by a photographic lens of the camera and image quality deterioration correction information for correcting the image quality deterioration. An information recording unit records at least one of the image quality deterioration information and the image quality deterioration correction information, or at least one of the image quality deterioration information and the image quality deterioration correction information in combination with photographing information as related information.

25 Claims, 7 Drawing Sheets

| CAMERA 1·1 SIDE |
|---|
| ※ VERTICAL AND HORIZONTAL SIDES IN COMMON |
| W1 VERTICAL AND HORIZONTAL → PATTERN 1 |
| W2 VERTICAL AND HORIZONTAL → PATTERN 2 |
| N  VERTICAL AND HORIZONTAL → PATTERN 3 |
| T1 VERTICAL AND HORIZONTAL → PATTERN 4 |
| T2 VERTICAL AND HORIZONTAL → PATTERN 5 |

| CAMERA 1·2 SIDE |
|---|
| ※ VERTICAL AND HORIZONTAL SIDES IN COMMON |
| W1 VERTICAL AND HORIZONTAL → PATTERN 1 |
| W2 VERTICAL AND HORIZONTAL → PATTERN 2 |
| N  VERTICAL AND HORIZONTAL → PATTERN 3 |
| T1 VERTICAL AND HORIZONTAL → PATTERN 4 |
| T2 VERTICAL AND HORIZONTAL → PATTERN 4 |

| CAMERA 1·3 SIDE |
|---|
| ※ VERTICAL AND HORIZONTAL SIDES SEPARATED |
| W  VERTICAL      → PATTERN 1 |
| W  HORIZONTAL    → PATTERN 2 |
| N  VERTICAL      → PATTERN 3 |
| N  HORIZONTAL    → PATTERN 4 |
| T  VERTICAL      → PATTERN 5 |
| T  HORIZONTAL    → PATTERN 6 |

FIG. 6B

| PHOTOPRINTER 1·1 SIDE |
|---|
| LENS CORRECTION INFORMATION |
| PATTERN 1 |
| PATTERN 2 |
| PATTERN 3 |
| PATTERN 4 |
| PATTERN 5 |
| PATTERN 6 |
| . |
| . |

CAMERA AND IMAGE FORMING SYSTEM USING THE CAMERA

BACKGROUND OF THE INVENTION

1. Field of the Invention

The present invention relates to a camera and an image forming system for using related information for image processing recorded by the camera during photographing or the like to perform a photographed image by the camera, resulting in forming a high-quality image.

2. Description of the Related Art

Conventionally, printing of an image photographed on a photographic film (simply referred to as a film, hereinafter) such as a negative film, a reversal film on a photosensitive material (a printing paper) is mainly performed by projecting the image of the film to the photosensitive material, and subjecting the photosensitive material to surface exposure, i.e., direct exposure (analog exposure).

On the other hand, recently, a printing equipment based on the use of digital exposure has been made available. In other words, a digital photoprinter has is practically used, which is adapted to photoelectrically read the image recorded on the film, convert the read image into a digital signal, then execute various image processing operations to form image data for recording, scan and expose the photosensitive material by a recording illumination modulated according to the image data to record an image (latent image), and then execute printing (finishing).

In the digital photoprinter, the image is regarded as digital image data, and an exposure condition during printing can be decided by processing the image data. Accordingly, a high-quality print never available by the prior direct exposure can be obtained by suitably performing correction of image jumping or blocking caused by a back light, stroboscopic photographing or the like, sharpness processing, correction of color or density failure, and so on. In addition, composition of a plurality of images, image division, character composition, and so on, can be performed by image data processing, and a print freely edited/processed can be outputted according to use. Moreover, according to the digital photoprinter, not only the image can be outputted as a print (photograph), but also the image data can be directly outputted to the recording medium to be used for various purposes other than the photograph.

Such a digital photoprinter basically comprises: an image input device having a scanner (image reading device) for photoelectrically reading an image recorded on a film and an image processor for processing the read image into output image data (exposure condition); and an image output device having a printer (image recording device) for scanning and exposing a photosensitive material to record a latent image according to the image data outputted from the image input device and a processor (developing device) for subjecting the exposed photosensitive material to development, and then executing printing.

As one of the causes of image quality deterioration when the image photographed on the film is reproduced in the form of a print, there is so-called aberration, which is caused by the lens performance of the camera.

For example, even in one lens, refractive indexes vary among red (R), green (G) and blue (B) lights. Consequently, so-called magnification chromatic aberration occurs, where even in the same position of a scene, image forming positions on the film are shifted among the R, G and B lights. When the image photographed on the film is reproduced, color shifting occurs in the obtained image. In addition, in order to obtain a proper photographed image, on a plane vertical to an optical axis, an image must be formed on an image forming surface in corresponding relation to such a state. However, in a normal lens, an image forming surface is relatively shifted in a direction of an optical axis, thus distorting a formed image, that is, generating so-called distortion aberration. Consequently, when an image photographed on a film is reproduced, the obtained image is distorted.

Other causes of image quality deterioration may include a reduction of marginal illumination amount, in which the image becomes darker in the marginal part than in the optical axis, focus deviation in which a focus position varies in the surface direction of the film, and so on, all of which are caused corresponding to the lens performance.

Thus, various methods have been heretofore proposed to obtain a high-quality image (print) by correcting the quality deterioration of a photographed image caused by the lens performance, and so on.

For example, JP 6-237376 A discloses a deteriorated image restoration system, which is designed to record information of image quality deterioration as a cause of photograph deterioration in a photographic film, intrinsic to a camera main body or a lens, read this information during printing, and then execute restoration processing for the deteriorated image based on the read information.

JP 4-342241 A discloses a camera, which is designed to determine a marginal distortion state of a photographic screen based on information of a photographic angle of a view, and information of an object distance, record the information of the marginal distortion in a photographic film, and then correct the marginal distortion using this information of the marginal distortion during printing.

In addition, JP 9-281613 A discloses an apparatus and a method of photographic processing for recording information regarding a camera, a lens or the like on a photographic film, and correcting a deteriorated quality of an image using this information during printing.

Furthermore, JP 11-231465 A discloses a printing system, which is provided with a new bar code in addition to a DX bar code and an extended DX bar code, etc. recorded on a film heretofore, and designed to record, for example, lens characteristic data of a film having a lens or the like in a photographic film as new information, correct magnification chromatic aberration, distortion aberration, and so on, by using this information, and then output a high-quality image having no color shifting or distortion.

However, according to any of the above-mentioned conventional image quality deterioration correcting methods, information (mainly, lens information) indicating the cause of the deterioration of an image recorded on a film at a camera side during photographing is read at a printing system side, and based on this information, the image quality deterioration is corrected by using correction information corresponding to the information stored in a data base or the like at the system side. Consequently, information regarding a new product must be stored each time it comes out, thus causing an enormous increase in an amount of information to be stored.

SUMMARY OF THE INVENTION

The present invention is for overcoming the foregoing problem inherent in the conventional arts, and objects of the invention are to provide a camera and an image forming system, which are capable of forming a high-quality image by easily correcting image quality deterioration caused by a lens without an enormous amount of information, when photographing is performed by a single-lens reflex camera, a digital camera, a compact camera, a film having a lens or the like.

In order to overcome the above-mentioned problem, a first aspect of the present invention is characterized by a camera for recording information related with deterioration of image used for image processing in at least one selected from a photographic film, a film cartridge and a recording medium, comprising: an information specifying unit which specifies at least one of image quality deterioration information related with image quality deterioration of the photographic image caused by a photographic lens of the camera and image quality deterioration correction information for correcting the image quality deterioration, and an information recording unit which records at least one of the image quality deterioration information and the image quality deterioration correction information, or at least one of the image quality deterioration information and the image quality deterioration correction information in combination with photographing information as related information.

Here, it is preferable that the image quality deterioration information is at least one of magnification chromatic aberration information, distortion aberration information, reduced marginal illumination information, blur correction information and wide angle distortion information.

Further, it is preferable that the image quality deterioration correction information is at least one of magnification chromatic aberration correction information, distortion aberration correction information, marginal reduced illumination correction information, blur correction information and wide angle distortion correction information.

Furthermore, it is preferable that the photographic image is at least one of focal length information, diaphragm information, lens type identification information, manufacturer identification information, camera type identification information, strobe information and image deterioration identification information.

Furthermore, it is preferable that the information recording unit records at least one of the image quality deterioration information and the image quality deterioration correction information, or at least one of the image quality deterioration information and the image quality deterioration correction information in combination with said photographing information, when fabricating loading or unloading the photographic film, the film cartridge or the recording medium into the camera or from the camera, photographing an image or before/after photographing the image.

Furthermore, it is preferable that the information specification unit selects and specifies at least one of the image quality deterioration information and the image quality deterioration correction information from among pieces of information prepared beforehand, and records the specified information by said information recording unit.

Furthermore, it is preferable that the information specification unit can select and specify all of a plurality of contents of the deterioration as a set, or each of the plurality of contents of the deterioration, regarding the image quality deterioration information.

Furthermore, it is preferable that the information specification unit can select and specify all of a plurality of contents of the correction as a set, or each of the plurality of contents of the correction, regarding the image quality deterioration correction information.

Furthermore, it is preferable that the information specification unit can select and specify at least one of the image quality deterioration information and the image quality deterioration correction information, as a set of the photographed image in a vertical direction and that in a horizontal direction, or separately select and specify each of that in the vertical direction and that in the horizontal direction of the photographed image.

Furthermore, it is preferable that the information specification unit selecting and specifying at least one of the image quality deterioration information and the image quality deterioration correction information from among pieces of information prepared beforehand, and recording the specified information by said information recording unit, wherein a plurality of objects to be selected representing a plurality of deterioration contents and/or correction contents regarding the image quality deterioration information and the image quality deterioration correction information to be selected by the information specification unit are recorded on the photographic film, the film cartridge or the recording medium when fabricating the camera and at least one of said plurality of selection objects is selected and recorded when photographing.

Additionally, in order to overcome the above-mentioned problems like the first aspect, a second aspect of the present invention is characterized by an image forming system for reading information related with image deterioration used for image processing of a photographic image of the camera which is recorded in at least one of a photographic film, a film cartridge and a recording medium by the camera, and performing the image processing using the read related information, and forming a reproduced image of said photographic image comprising the steps of:

reading at least one of image quality deterioration information as to image deterioration of the photographic image caused by a photographic lens of the camera and image deterioration correction information for correcting the image quality deterioration recorded as the related information by the camera from at least one of the photographic film, the film cartridge, and the recording medium, or the at least one thereof in combination with a photographic information;

correcting the image quality deterioration based on at least one of the image quality deterioration information and the image deterioration correction information, or the at least one thereof in combination with the photographic information; and forming the reproduced image.

Here, it is preferable that the image quality deterioration information is at least one of magnification chromatic aberration information, distortion aberration information, reduced marginal illumination information, blur information, and wide angle distortion information.

Further, it is preferable that the information of image quality deterioration correction is for performing at least one of magnification chromatic aberration correction, distortion aberration correction, marginal reduced illumination correction, blur correction, and wide angle distortion correction.

It is preferable that the photographing information is at least one of a focal length information, a diaphragm information, a kind of lens identification information, manufacturer identification information, a type of camera identification information, information of a strobe, and information of identifying image quality deterioration.

Further, it is preferable that at least one of the image quality deterioration information and the image quality deterioration correction information is prepared beforehand for each of all photographing conditions.

Furthermore, it is preferable that a plurality of patterns are prepared beforehand for at least one of the image quality deterioration information and the image quality deterioration correction information, and the image quality deterioration is corrected using information selected and specified from among the plurality of patterns.

Furthermore, it is preferable that a plurality of patterns are prepared beforehand for at least one of the image quality deterioration information and the image quality deterioration correction information, and the image quality deterioration is corrected using information selected and specified from among the plurality of patterns, in which each of the information of image quality deterioration and the information of image quality deterioration correction to the prepared beforehand is respectively information of image quality deterioration and information of image quality deterioration correction under a representative photographing condition.

Furthermore, it is preferable that a plurality of patterns are prepared beforehand for at least one of the image quality deterioration information and the image quality deterioration correction information, and the image quality deterioration is corrected using information selected and specified from among the plurality of patterns, in which each of image quality deterioration information and the image quality deterioration correction information to be prepared beforehand is respectively information of image quality deterioration and information of image quality deterioration correction under a representative photographing condition and in which under a photographing condition other than the representative photographing condition, correction is performed by interpolation from the image quality deterioration information and the image quality deterioration correction information under the representative photographing condition, and by calculating new information of image quality deterioration and new information of image quality deterioration correction.

Furthermore, it is preferable that a plurality of patterns are prepared beforehand for at least one of the image quality deterioration information and the image quality deterioration correction information, and the image quality deterioration is corrected using information selected and specified from among the plurality of patterns, in which the information of image quality deterioration correction for which the plurality of patterns are prepared beforehand, is fine-adjusted.

Furthermore, it is preferable that at least one of the image quality deterioration information and the image quality deterioration correction information is prepared beforehand for each of all photographing conditions, in which the each of all photographing conditions is defined by at least one of information of a diaphragm, information of a focal lengths and information of a strobe.

Furthermore, it is preferable that at least one of the image quality deterioration information and the image quality deterioration correction information is prepared beforehand for each of all photographing conditions, in which correction of the image quality deterioration of the photographic image caused by the photographic lens is performed by each of contents of the correction as a set, or separately performed by each of contents of the correction.

Furthermore, it is preferable that correction of the image quality deterioration of the photographic image caused by the photographic lens is performed as a set of the photographed image in a vertical direction and that in a horizontal direction, or separately select and specify each of that in the vertical direction and that in the horizontal direction of the photographed image.

Furthermore, it is preferable that the related information of at least one of the image quality deterioration information and the image quality deterioration correction information is managed on a network, and downloaded or referred by way of said network if necessary, in which correction of the image quality deterioration caused by the photographic lens is performed based on the related information which has been downloaded and referred.

Furthermore, it is preferable that the related information of at least one of the information of image quality deterioration and the information image quality deterioration correction is managed on a communication network, and downloaded or referred by way of the network if necessary, in which correction of the image quality deterioration caused by the photographic lens is performed based on the related information which has been downloaded and referred, and in which at least one of the image quality deterioration information and the information of image quality deterioration correction information is managed by a manufacturer's server, access is made to the manufacturer's server by way of the network using at least one of the manufacturer identification information, and lens identification information in combination with said manufacture's identification information thereafter the related information is referred and downloaded to perform correction of the image quality deterioration caused by the photographic lens based on the related information which has been downloaded or referred.

Furthermore, it is preferable that after completion of the correction of the image quality deterioration caused by the photographic lens, at least one of print outputting and image data outputting is performed.

Furthermore, it is preferable that the camera is a camera for recording information related with image deterioration of image used for image processing of a photographic image on at least one of a photographic film, a film cartridge and a recording medium, comprising:

an information specifying unit which specifies at least one of image quality deterioration information related with image quality deterioration of the photographic image caused by a photographic lens of the camera and image quality deterioration correction information for correcting the image quality deterioration, and an information recording unit which records at least one of the image quality deterioration information and the image quality deterioration correction information, or at least one of the image quality deterioration information and the image quality deterioration correction information in combination with photographing information as related information.

BRIEF DESCRIPTION OF THE DRAWINGS

FIGS. 6A and 6B are views illustrating sets of correction patterns:

FIGS. 7A and 7B are views illustrating other correction patterns:

DESCRIPTION OF THE PREFERRED EMBODIMENT

The preferred embodiment of the present invention for a camera and an image forming system will be described in detail with reference to the accompanying drawings.

Figure 1:
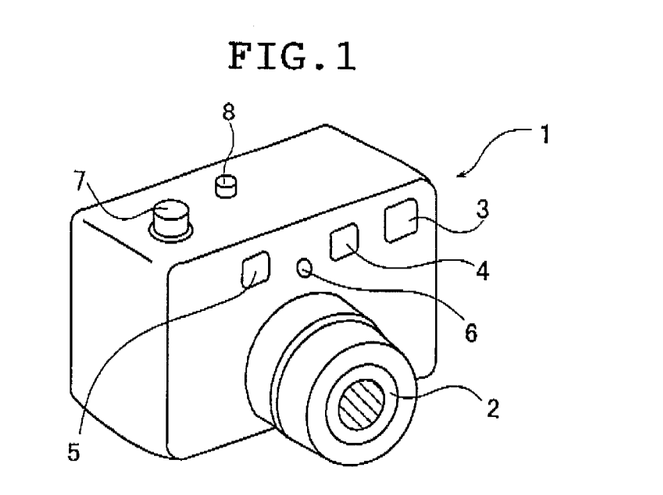
FIG. 1 is a perspective view schematically showing an appearance of a camera according to an embodiment of the invention.

FIG. 1 is a perspective view schematically showing an appearance of a camera according to an embodiment of the present invention.

Here, explanation is made based on a representative example of a compact camera. However, a camera type of the present invention should not be limited to the compact camera. For example, a single-lens reflex camera may be used. Further, any type of camera is available. For example, a film camera such as an optical camera, a digital camera, a hybrid camera, an APS camera, and a film having a lens such as throw away camera are also acceptable.

As shown in FIG. 1, a zoom lens barrel 2 provided with an optical zoom lens inside is provided in a front center of a camera 1. A finder objective window 3, an AF illumination projecting window 4, an AF light receiving window 5, and an AE light receiving window 6 are disposed in a front upper part of the camera 1. In addition, a main body of the camera 1 includes a shutter button 7, and an image quality deterioration association information specifying button 8 for specifying information related with image quality deterioration used to correct image quality deterioration caused by the camera lens. By the way, the image quality deteriorated association information is used for correcting image deterioration owing to a photographic lens (camera lens) of the camera 1 in an image processing for correcting image quality deterioration of the image photographed by the camera 1. In a narrow meaning, the image quality deterioration related information is meant by an image quality deterioration correction information for correcting an image quality information in itself and/or image quality deterioration caused by a camera lens. In a broad meaning, the image quality deterioration related information further includes a meaning of photographic information in addition to the above-mentioned narrow meaning. The following includes an explanation about image quality deterioration related information in both the narrow meaning and the broad meaning further including photographic information representative of image quality correction information. Needless to say image quality deterioration association information is not limited to, only these meanings.

Though not shown, the camera 1 comprises buttons and levers for performing various operations other than the foregoing components. Further, the camera 1 can be provided with a memory "(not shown)" which stores a content to be selected by the image quality deterioration related information designating button 8, as image quality deterioration related information such as image quality deteriorated information and image quality deterioration correction information, and a display device such as LCD which displays a content to be selected when the content is selected.

Figure 2A:
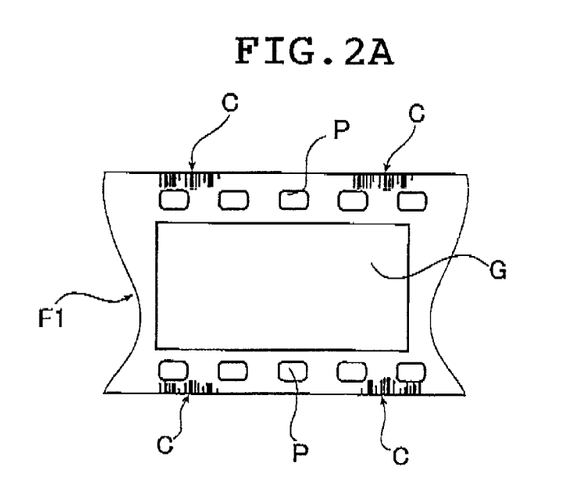
FIGS. 2A and 2B are respectively a schematic view showing a film loaded in the camera, and a sectional view showing a part of a section along a photographic optical axis inside the camera.
Figure 2B:
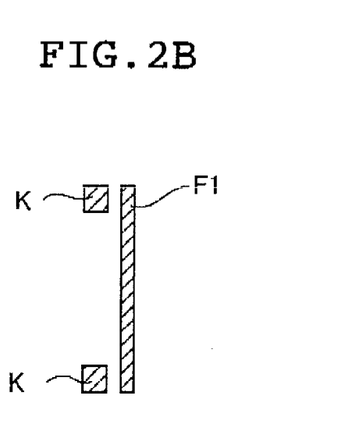

FIG. 2A is a schematic view showing a film F1 loaded in the camera 1. The film F1 is formed in an elongated roll shape manner, and perforations P for being fed inside the camera 1 are provided outside an image area G. On the film F1, a bar code C indicating information of image quality deterioration correction or information of photographing is optically recorded between outer ends of the both perforations P and both outer ends of the film. FIG. 2B shows a part of a section cut away along a photographic optical axis inside the camera 1. Thus, inside the camera 1, bar code writers K are provided in both ends of the film F1 in a width direction in order to optically record the information of image quality deterioration correction or the like.

Figure 3A:
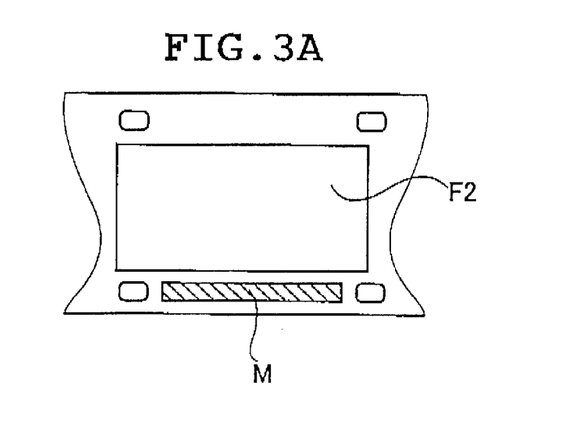
FIGS. 3A and 3B are respectively a schematic view showing an example of a film having a magnetic recording unit, and a sectional view showing a part of a section along the photographic optical axis inside the camera.
Figure 3B:
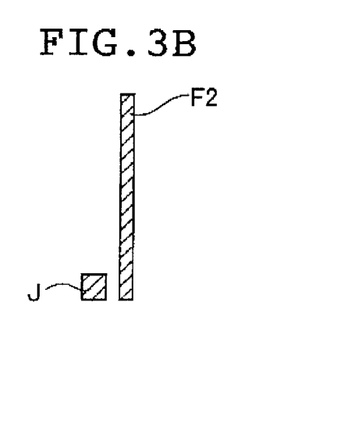

In the embodiment, the information of image quality deterioration correction or the like is optically recorded on the film F1 by the bar code C. However, information recording on the film F1 is not limited to such optical recording. For example, as shown in FIG. 3A, a magnetic recording unit M may be provided in a film F2, and as shown in FIG. 3B, the information of image quality deterioration correction may be magnetically recorded in the magnetic recording unit M by a magnetic recording device J.

In addition, when the information is not only recorded on the film but also electrically recorded in an IC of a film cartridge, or in the case of digital image data, for example in the digital camera, the information may be added to the data, recorded in a header of the data or buried in the image data. As described in detail later, preferably, the information of image quality deterioration correction etc. is selected and specified from a plurality of pieces of information prepared beforehand in the image forming system side.

Next, description will be made of a digital photoprinter constituting an image forming system, designed to form an image by executing image processing such as the correction of image quality deterioration using information of image quality deterioration correction etc. recorded on a film or the like for an image photographed by the camera having the foregoing information recording function.

Figure 4:
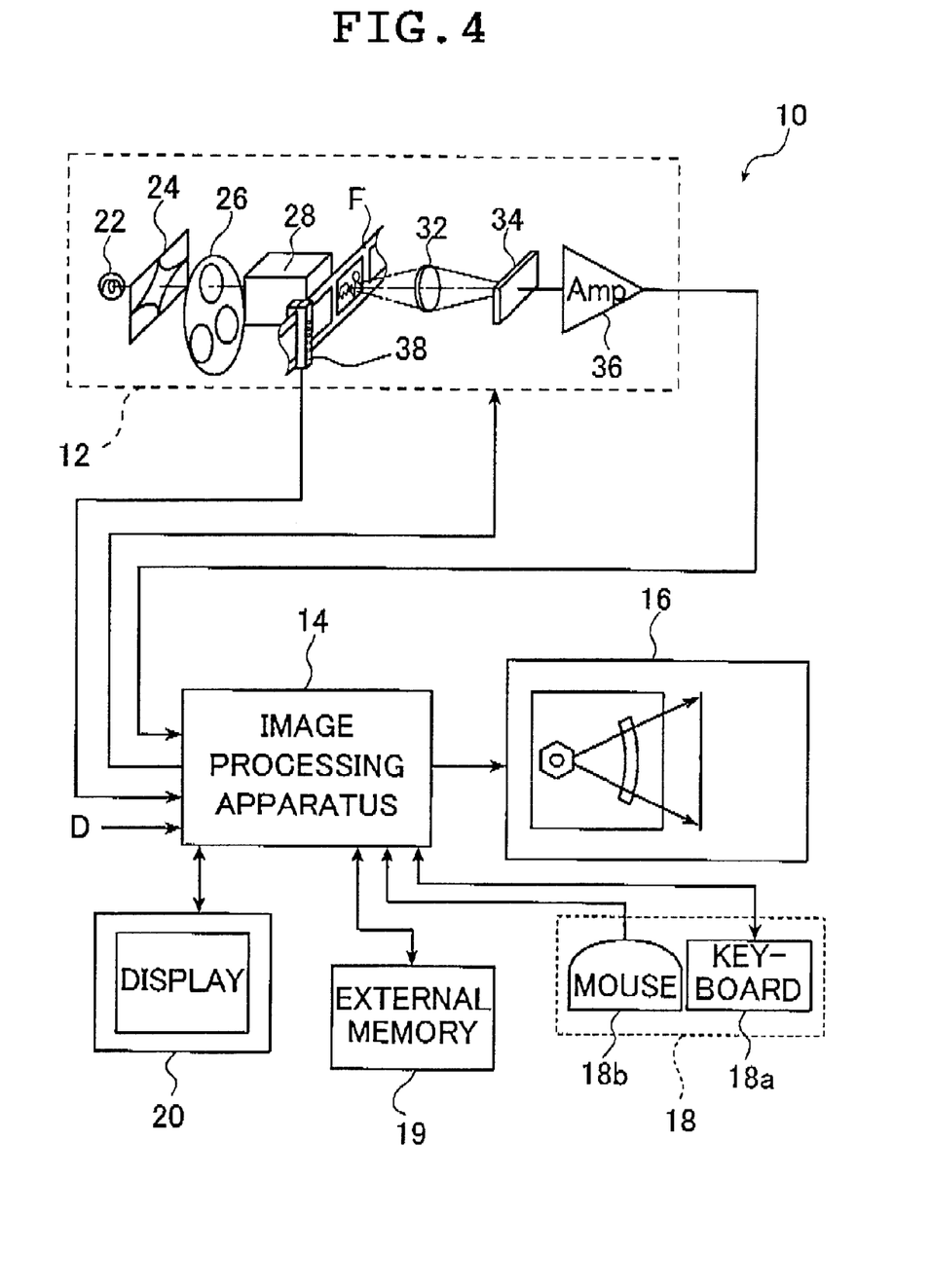
FIG. 4 is a block diagram schematically showing a digital photoprinter constituting an image forming system of the embodiment of the invention.

FIG. 4 is a block diagram schematically showing the digital photoprinter constituting the image forming system of the embodiment of the invention.

As shown in FIG. 4, a digital photoprinter 10 (hereinafter, simply referred to as a photoprinter) basically includes: a scanner (image reader) 12 for photoelectrically reading an image photographed on a film F; an image processor 14 for executing image processing for the read image data (image information), operation and control of the entire photoprinter 10, and so on; and a printer 16 for subjecting a photosensitive material (printing paper) to image exposure by an optical beam modulated according to the image data outputted from the image processor 14, executing development processing, and then outputting a finished print.

Some components are connected to the image processor 14: an operation system 18 including a keyboard 18a and a mouse 18b for entering and setting various conditions, selection and specification of processing, instruction on color/density correction, and so on; an external memory 19 for storing data, processing programs or the like necessary to execute a variety of image processing including image quality deterioration correction processing, and outputting image data; and a display 20 for displaying an image read by the scanner 12, various operation instructions, and setting of various conditions/registration screen, and so on. Not only the image data read from the film by the scanner 12 but also for example, digital image data D photographed by the digital camera or the like is entered in the image processor 14.

The scanner 12 is a device for photoelectrically reading images photographed on the film. For the like frame by frame, and includes the following components: a light source 22; a variable diaphragm 24; a color filter plate 26 having three color filters of red (R), green (G) and blue (B) for dividing an image into three primary colors of R, G and B, and operate an optional color filter on an optical path by rotation; a diffusion box 28 for making uniform a reading light made incident on the film F in the surface direction of the same; an image forming lens unit 32; a CCD sensor (area sensor, here) 34 as an image reading sensor for reading the image of one frame of the film; and an amplifier 36. Further, in order to deal with a case where the information of image quality deterioration correction is optionally recorded in both edges of or between the frames of the film F with a bar code or the like, a bar code reader 38 is provided for optically reading the information of image quality deterioration correction. In order to deal with a case where the information of image quality deterioration correction is magnetically recorded on the film F, a magnetic head is provided for reading the information. In order to deal with a case where the information is electrically recorded in an IC of a cartridge, a terminal is provided for electrically reading Thus, in the illustrated photoprinter 10, a dedicated carrier freely attached to/detached from a main body of the scanner 12 is prepared according to a type and size of a film F, such as a 240-size negative film of APS, a 135-size negative (or reversal) film or the like, a shape of the film F such as a strip or a slide, or a kind of processing such as trimming. By changing the carrier to another, various films and processing can be dealt with. A photographic image (frame) photographed on the film F and the like and used for print production is carried to a predetermined reading position by the carrier and held therein. The bar code reader 38 is disposed in the carrying upstream side of the predetermined reading position of the carrier, and adapted to read the information of image quality deterioration correction when the film F is carried to the predetermined reading position. As above-mentioned, in order to deal with the case where a magnetic track is provided in the edge of the film F, and the information is magnetically recorded as in the case of the 240-size film of APS, or the case where the information is recorded in IC of the film cartridge, a unit is provided for reading such magnetic information and the like, and the information of image quality deterioration correction, etc. is read when the film F is transported to the reading position. In addition, when the digital image data is directly input to the image processor 14, for example, the information of image quality deterioration correction recorded in the header or the like of the digital image data etc. is directly used in the image processor 14 as it stands.

An output signal (image data) from the scanner 12 is outputted to the image processor 14.

Figure 5:
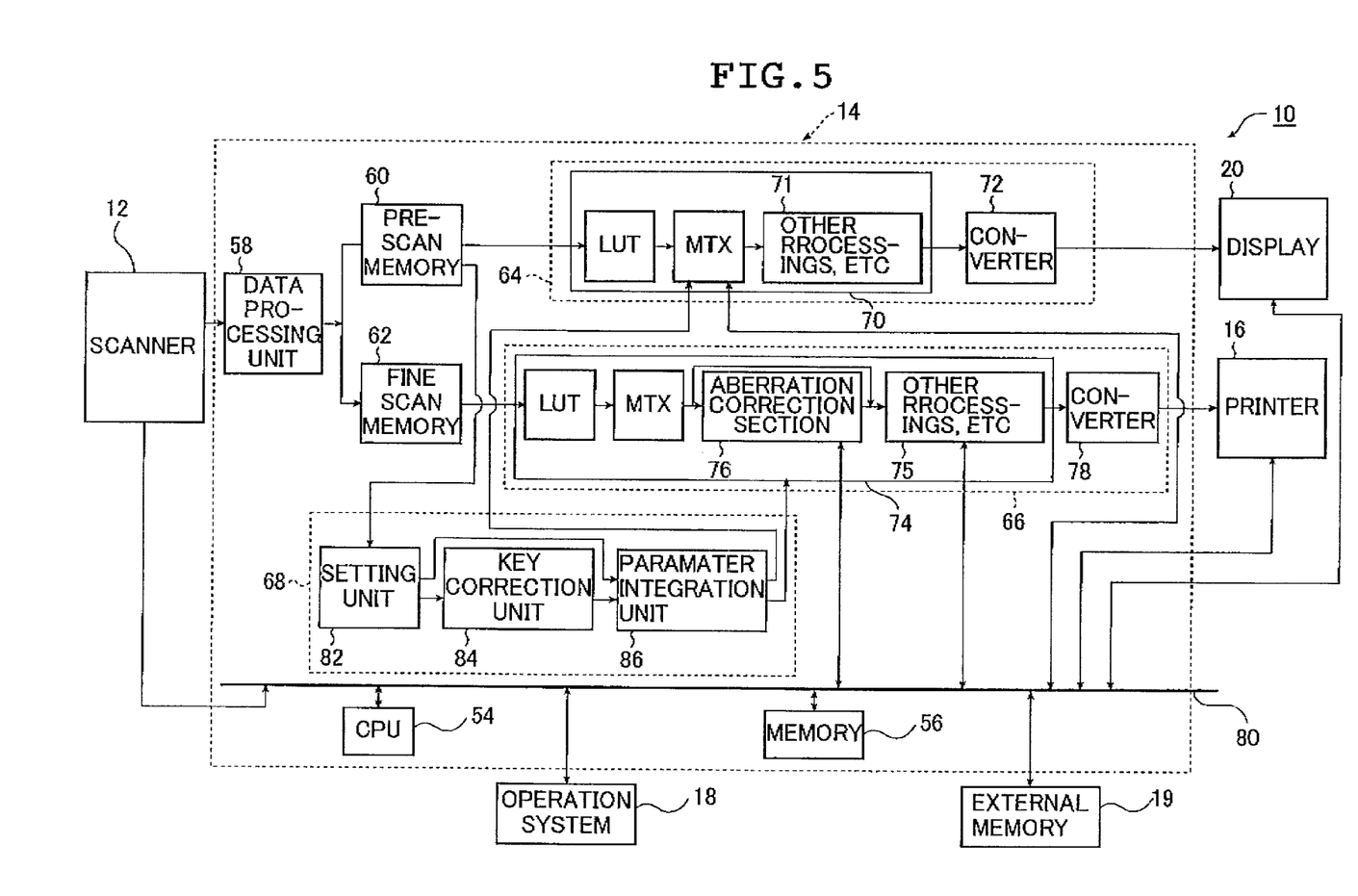
FIG. 5 is a block diagram schematically showing a configuration of an image processor of FIG. 4.

FIG. 5 is a block diagram showing the image processor 14. The image processor 14 includes: a CPU 54 for executing and controlling image processing including image quality deterioration correction processing, and controlling the entire photoprinter 10; and an internal memory 56 for storing necessary information. In the internal memory 56, a representative numerical pattern has been stored regarding image quality deterioration correction information used to correct image quality deterioration caused by the camera lens. As described in detail later, in this case, the image forming system side may be adapted to hold a set of all parameters including magnification chromatic aberration correction, distortion aberration correction, reduced marginal illumination correction, sharpness correction, blur correction and wide angle distortion correction according to the method of specifying image quality deterioration correction information at the camera side, or hold some parameters for each item.

The image processor 14 further includes: a data processing unit 58; a pre-scan memory 60; a fine scan memory 62; a prescanned image processing unit 64; a fine scanned image processing unit 66; and a condition setting unit 68. In addition to these components, the image processor 14 includes a device or the like disposed to decide a diaphragmming value of the variable diaphragm 24 or a storage time of the CCD sensor 34 during fine scanning. The operation system 18, the external memory 19 and the display 20 are connected through a CPU bus 80 to the respective units by way of the CPU 54.

In the image processing system, each of R, G and B signals outputted from the scanner 12 is processed into digital image data by the A/D processing unit 58, prescanned data is stored in the pre-scan memory 60, and fine scanned data is stored in the fine scan memory 62. The prescanned data and the fine scanned data are substantially same with each other except for difference between resolution (pixel density) and signal levels. The prescanned data stored in the pre-scan memory 60 and the fine scanned data stored in the fine scan memory 62 are processed by the prescanned image processing unit 64 and the fine scanned image processing unit 66, respectively. The prescanned image processing unit 64 includes an image processing unit 70 and an image data conversion unit 72. On the other hand, the fine scanned image processing unit 66 includes an image processing unit 74 and an image data conversion unit 78. The image processing unit 70 (referred to as a processing unit 70, hereinafter) and the image processing unit 74 (referred to as a processing unit 74, hereinafter) are both adapted to perform predetermined image processing for an image (image data) read by the scanner 12 according to image processing conditions set by the later-described condition setting unit 68. The processing units 70 and 74 substantially execute same processing except for difference between the pixel densities of image data to be processed. Image processing at the processing units 70 and 74 generally includes color balance adjustment, contrast correction (gradation processing), brightness correction, dodging processing (compression/decompression(expansion) of density dynamic range), chroma correction, sharpness (sharpening) processing, wide angle distortion correction and so on, and in addition to these, exemplified is at least one selected from magnification chromatic aberration correction, distortion aberration correction, marginal illumination correction, blur correction, and so on.

The above-mentioned processing is performed using a publicly known method, in which an arithmetic operation, processing by a look-up table (LUT), a matrix (MTX)

operation, processing by a filter, and so on, are properly combined. In the illustrated example, color balance adjustment, brightness correction and contrast correction are performed using the LUT; and chroma correction is performed by the MTX. In addition, the other operations such as sharpness processing, dodging processing, and so on, are performed at blocks 71 and 75 according to instructions by an operator, image data or the like.

In this case, between the MTX of the processing unit 74 for processing fine scanned data and the block 75, an aberration correction unit 76 is disposed for executing at least one of magnification chromatic aberration correction and distortion aberration correction, and electronic variable power processing, as image quality deterioration correction processing.

Among a plurality of bits of image quality deterioration correction information prestored in the internal memory 56, image quality deterioration correction information corresponding to image deterioration correction information read from a film using the bar code reader 38 is read out by instructions of the CPU 54, and fed to the aberration correction unit 76. The aberration correction unit 76 carries out magnification chromatic aberration correction and distortion aberration correction, and electronic variable power processing by using the image quality deterioration correction information fed by the CPU 54, and information on the position of image data (pixel) read from the fine scan memory 62 and subjected to various image processing, e.g., a coordinate position from a center of the image (which the ordinal order number of a pixel spaced from the center pixel is). The electronic variable magnification processing expands or reduces the image by image data processing, and outputs the image data set to a size according to the output image. The electronic variable power processing is usually performed by interpolating the image data. There is no limitation placed on the method thereof, and various well-known methods can be used. For example, a method using bilinear interpolation, a method using spline interpolation, and so on, are exemplified.

The image data processed by the processing units 70 and 74 are sent to the image data conversion unit (converter) 72 and 78. The image data conversion unit 72 of the prescanned image processing unit 64 converts the image data processed by the processing unit 70, using a three-dimensional LUT or the like, into image data to be displayed by the display 20. On the other hand, the image data conversion unit 78 of the fine scanned image processing unit 66 similarly converts the image data processed by the processing unit 74, by using the three-dimensional LUT, into image data to be recorded by the printer 16, and feeds the image data to the same as output image data corresponding to image recording using the printer 16.

Various processing conditions at the prescanned image processing unit 64 and the fine scanned image processing unit 66 are set by the condition setting unit 68. This condition setting unit 68 includes an image processing condition setting unit (setting unit) 82, a key correction unit 84, and a parameter integration unit 86.

The image processing condition setting unit 82 (referred to as a setting unit, hereinafter) selects image processing to be executed, sets image processing conditions for the processing units 70 and 74 by using pre-scanned data, and feeds the conditions to the parameter integration unit 86. Specifically, the setting unit 82 makes a density histogram, calculates the amount of image characteristics of an average density, a large area transmission density (LATD), high illumination (lowest density), shadow (highest density), and so on, and further decides or sets image processing conditions regarding the formation of LUT for gray balance adjustment, brightness correction, contrast correction, the formation of a matrix operation for chroma correction and the like according to instruction made by the operator using the operation system 18, if necessary. Furthermore, the setting unit 82 decides or sets image processing condition of parameter etc. necessary for prefilter processing, selective shading (dodging) processing, electrical magnification chromatic aberration correction, aberration correction processing for aberration such as traverse chromatic aberration and distortion aberration, reduced marginal illumination correction, blur correction for correcting a blurred image, wide angle distortion correction and so on according thereto.

The key correction unit 84 calculates the adjustment amounts of the image processing conditions (e.g., correction amount of LUT) according to various instructions or the like entered by the key or the mouse 18b for adjusting brightness, color, contrast, sharpness, chroma, and so on, set in the keyboard 18a, and feeds the result of the calculation to the parameter integration unit 86. The parameter integration unit 86 receives the image processing conditions set by the setting unit 82, and sets the received image processing conditions in the processing unit 70 and the processing unit 74 of the prescanned image processing unit 64 and the fine scanned image processing unit 66, then corrects (adjusts) the image processing conditions set in the respective units according to the adjustment amounts calculated by the key correction unit 84, or again sets image processing conditions again.

Next, the operation of the embodiment will be described.

The embodiment is designed to output a print of a high-quality image by correcting image quality deterioration caused by a camera lens when photographing is performed by a camera (e.g., compact camera or the like). In this case, in the image forming system side, some bits of information regarding image quality deterioration correction are held beforehand, and image quality deterioration correction processing is performed by using one corresponding to the information of image quality deterioration correction specified by the camera side. Thus, a memory load on the system side is reduced by limiting information held beforehand in the image forming system side.

When photographing by a camera 1, a photographer specifies the information of image quality deterioration correction (lens correction information) used to correct image quality deterioration caused by the camera lens. Specifically, a correction pattern is selected and specified by operating a button 8 provided in the camera 1 to specify the information of image quality deterioration correction. Regarding the specifying method, there are a method of selecting and specifying a pattern according to a focal length, in which magnification chromatic aberration correction, distortion aberration correction, reduced marginal illumination correction, and sharpness correction (blue correction) are all set, and a method of separately selecting and specifying correction patterns according to a focal length and each of these kinds of correction and each correction such as the magnification chromatic aberration correction and so on. Any of these two methods can be used. In addition, an arrangement may be made to enable wide angle distortion correction to be specified. Here, the wide angle distortion is meant by distortion which occurs only when photographing with a camera having a wide angle lens, and can be corrected by applying strong distortion aberration correction (overcorrection). Thus, for example, a wide angle distortion correction button or the like may be prepared, and a correction pattern may be set by pressing this button to apply stronger distortion aberration correction. Alternatively, information regarding wide angle distortion correction may also be incorporated beforehand in the above-mentioned correction pattern.

Aberration includes chromatic aberration (chromatic aberration on an axis, and magnification chromatic aberration), Seidel's five aberrations (spherical aberration, coma aberration, astigmatism, field curvature, and distortion aberration), wide angle distortion, and so on. Image quality deterioration caused by the photographic lens includes, in addition to aberration, reduced marginal illumination, vignetting, double-line blur, flare, ghost, and so on. Such image quality deterioration caused by a photographic lens, each can be objected for the present invention.

Further, a camera relating to the present invention can beforehand store a content to be selected (objects to be selected) such as a pattern or patterns of image quality deterioration related information (deterioration pattern of image quality deterioration information and/or correction pattern of image quality deterioration correction information) in an unshown memory. Further, the camera can read out the content to display it on a display device (unshown) such as a liquid crystal display (LCD). Furthermore, the camera can select any desired one or ones of the displayed content from among objects to be selected (selection contents) of the displayed image quality deterioration related information and specifies it or them using the image quality deterioration related specifying button 8. Finally, the camera can store the specified one or ones on a photographic film, a film cartridge and a recording medium. However, a camera whose photographic lens is never changed, such as a compact camera, an APS camera, a film with a lens and a digital still camera can prepare only image quality deterioration related information such as image quality deterioration information of a predetermined deterioration pattern or image quality deterioration correction information, thereby being capable of performing the specification using the image deterioration association information specifying button 8 and the storage at a predetermined timing.

Here, a plurality of patterns representing a plurality of deterioration and/or correction contents as to image quality deterioration association information such as image quality deterioration information and image quality deterioration correction information to be selected using the image quality deterioration association information specifying button 8 may be beforehand stored on a photographic film, a film cartridge or a recording medium when the camera is fabricated.

Figure 6A:
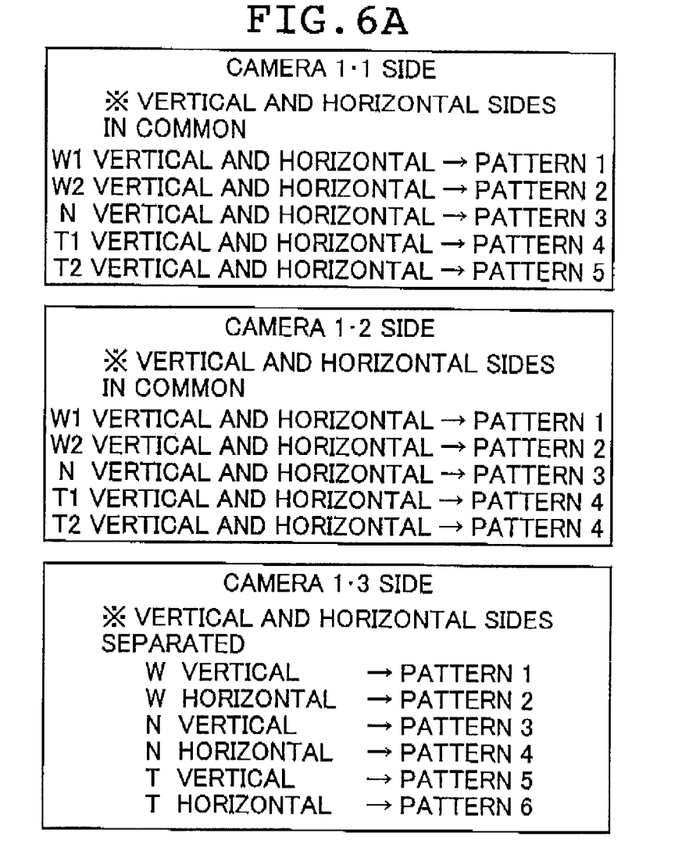
FIG. 6A showing the set specified at the camera side.
Figure 6B:
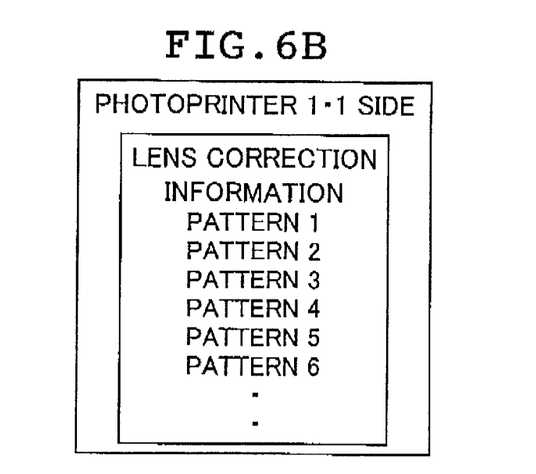
FIG. 6B showing the set held at the image forming system side.

For selecting and specifying the patterns set with each of the above-described kinds of correction, as shown in FIG. 5A, one is selected and specified from correction patterns (pattern 1, pattern 2, pattern 3, and so on) including magnification chromatic aberration correction, distortion aberration correction, reduced marginal illumination correction and sharpness correction (blur correction) all in a set, according to each focal length of a wide angle W, a standard N or a telescopic view T. Here, each of the correction patterns (pattern 1, pattern 2, pattern 3, and so on), as shown in FIG. 6B, is preset and stored as a pattern including all the corrections in a set in the image forming system side (internal memory 56).

In FIG. 6A, for example, in a camera 1-1, regarding five kinds of focal lengths, i.e., two kinds of wide angles (W1, and W2), a standard (N) and two kinds of telescopic views (T1, and T2), correction patterns set common are in the respective vertical and horizontal directions of the screen, patterns 1 to 5 are set, and one is selected and specified from these patterns. Also in a camera 1-2, correction patterns are common in the vertical and horizontal directions, further a common correction pattern (pattern 1) is set for two kinds of wide angles, and a common correction pattern (pattern 4) is also set for two kinds of telescopic views. In addition, in a camera 1-3, respectively for the three kinds of focal lengths, i.e., a wide angle W, a standard N and a telescopic view T, patterns are separately set in vertical and horizontal directions.

Figure 7A:
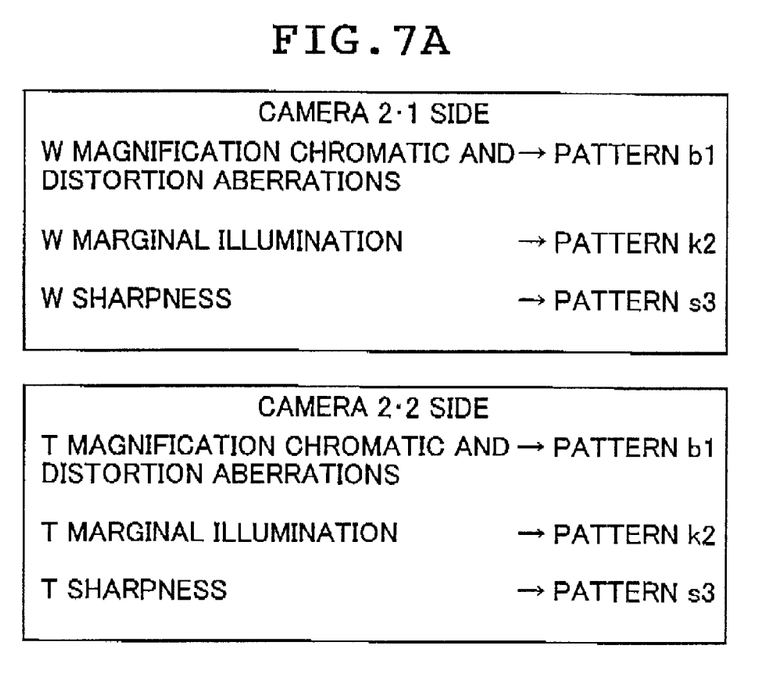
FIG. 7A showing those specified at the camera side; and 7B showing those held at the image forming system side.
Figure 7B:
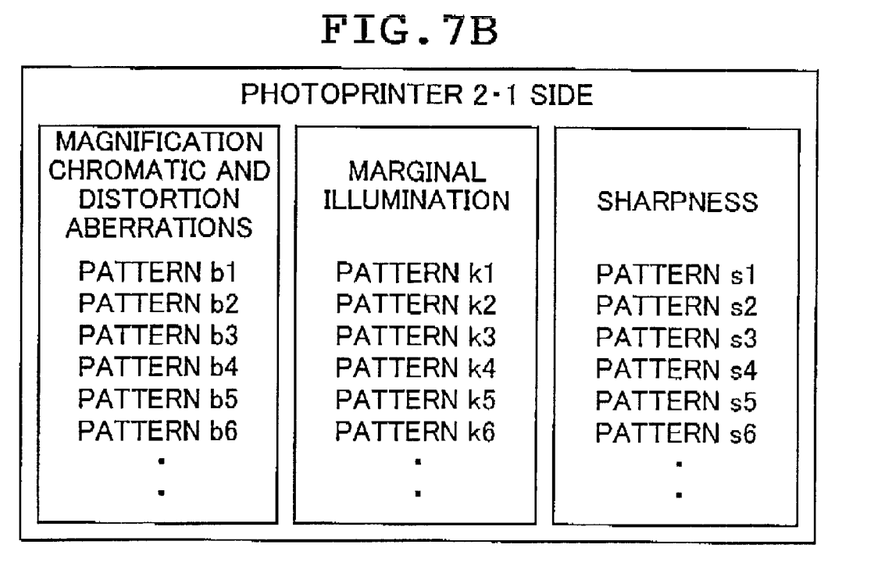

For separately selecting and specifying correction patterns according to a focal length and a correction content, as shown in FIG. 7A, correction patterns are set for respective focal lengths and correction contents, and a pattern is selected and specified from these set correction patterns. For example, in a camera 2-1, regarding a wide angle W, a pattern b1 is set for magnification chromatic aberration correction and distortion aberration correction; a pattern k2 is set for marginal illumination correction; and a pattern 53 for sharpness correction. In a camera 2-2, regarding a telescopic view T, a pattern b1 is set for magnification chromatic aberration correction and distortion aberration correction; a pattern k2 is set for marginal illumination correction; and a pattern s3 is set for sharpness correction. These patterns are preset for respective corrections in the image forming system side as shown in FIG. 7B.

Preferably, during camera development, lens designing is performed by taking the image quality deterioration correction information of the image forming system into consideration. Thus, one can be selected and specified from among pieces of information of image quality deterioration correction information prepared beforehand in the image forming system.

In any case, in the image forming system side, representative correction information is prestored on numerical patterns, correction processing is performed according to pattern correction information selected and specified by the camera side and a distance from a center of an optical axis during photographing, and a result is output as a print or image data. In the image forming system side, preferably, the information of image quality deterioration correction should be prepared by each of all the photographing conditions. Here, the photographing conditions can be defined by a diaphragm information, focal length information and strobe information and so on.

In addition, the information of image quality deterioration correction information (lens correction information) may be a correction formula itself for executing correction processing for correcting image quality deterioration such as magnification chromatic aberration correction, distortion aberration correction, reduced marginal illumination correction, blur correction (sharpness correction) or wide angle distortion correction or the like, a correction coefficient, a temporary correction coefficient or the like. Especially, when using the temporary correction coefficient, recalculation is performed according to an image processing condition such as a photographing condition, a print size, and correction processing is executed using the result of the re-calculation.

When using the correction formula, it may be more preferable to increase the number of degrees for the correction formula according to a photographing condition such as a focal length (a wide angle W, a standard N, or a telescopic view T) by each camera. This is because a larger number of degrees are generally necessary for more complex aberration. For example, preferably, the number of degrees is larger for a compact camera than for a film having a lens. This is attributed to the fact that a lens of the film having a lens has a better feature because it is basically single-focused, and correction can be made by a small number of degrees, such as about third degrees. In the cases of the wide angle W and the telescopic view T, degrees should preferably be higher than that for the standard N. This is because aberrations are larger for the wide angle and the telescopic view than that for the standard.

In the case of magnification chromatic aberration correction, as a color which becomes a reference of three primary colors of R, G, and B, usually G is set as a reference, and the image magnifications of R and B are converted to match the images of R and B with the image of G, thus correcting magnification chromatic aberration. For the two colors of R and B other than G as a reference color, a parameter for R and a parameter for B may be separately prepared, or only one parameter may be used for the two colors of R and B other than the reference color G. However, in the case of using only one parameter, each of codes should be reversed.

Blur correction is basically sharpness correction, and gains of R, G and B in the sharpness processing should preferably be independently controlled and changed in sharpness processing. More preferably, the gains may be changed depending on a position at an image. For example, an image is divided into blocks, and a gain is changed for each block. Alternatively, sharpness intensity is changed according to a distance from a center of the image, standard intensity is set at the center, and a gain is increased toward the end.

In the above-mentioned examples, image quality deterioration correction information (lens correction information) is used as image quality deterioration related information, such as magnification chromatic aberration correction information, distortion aberration correction information, marginal distortion (illumination reduction) correction information, blur correction (sharpness correction) information and wide angle distortion correction information which are defined by a correction equation and correction coefficient etc. in order to correct image quality deterioration. However, the present invention is not limited within them. Namely, apart from the image quality deterioration correction information or in addition to the image quality deterioration correction information, information as to image quality deterioration itself which is i.e. image quality deterioration information (lens information) itself such as magnification chromatic aberration information, distortion aberration information, reduced marginal illumination information, blur (unfocused) information, and wide angle distortion information. For example, intensity and pattern of these various kinds of image deterioration (and a pixel position corresponding thereto) etc. can be used therefore. In order to correct image quality deterioration using the image quality deterioration information (lens information) at an image forming system side, this side should hold a correction equation and a correction coefficient etc. for correcting the image quality deterioration, depending on the above-mentioned various kinds of image deterioration (and a pixel position corresponding thereto).

When a photographer specifies image quality deterioration association information (including image quality deterioration information etc.) represented by the information of image quality deterioration correction during photographing by the camera 1, the image forming system side may be enabled to set whether or not to execute image quality deterioration correction processing at the time of outputting an image (a print or an image data). Such setting may be linked to a photographing mode.

In addition, in the case of the film camera, the recording of such information is performed by a method for optically recording the information as a bar code in the end part of, for example a film, as described above, magnetically recording the information in the magnetic recording portion of a film, or the like. In the case of the film cartridge with an IC, the recording of the information is performed by a method for electrically recording the information in the IC or the like. In the case of the digital camera, information recording is performed by a method for adding the information to image data, recording the information in a header of the image data, burying the information in the image data by means of electronic watermarking or the like. As a medium to be recorded with the information, various recording media (for recording image data) are applicable: in the case of the film camera, a film, a patrone, a film cartridge, and a film cartridge with an IC, and so on; and in the case of the digital camera, a smart medium, a compact flash, a PC card, a memory stick, a multimedia card or a built-in memory, a hard disk, and so on.

Timing for recording the information in the film, the recording medium or the like by the camera is most typically during photographing or before/after photographing. However, there should be no limitation in this regard, and the timing may be set during the loading/unloading of the film, the recording medium or the like into/from the camera. In the case of the film having a lens, the information of image quality deterioration correction (lens correction information) may be optically recorded in a film with a bar code beforehand during film manufacturing. In the case of an APS film, the information may be optically recorded in a rod code freely usable by a film manufacturer at the head and the tail of the film. Alternatively, the information may be magnetically recorded beforehand in a magnetic layer of the APS film. Further, in the case of the film with a lens using a film cartridge having an IC, the information of image quality deterioration correction can be electrically recorded beforehand in the cartridge during film manufacturing.

In the case of the digital camera, a photographed image is reproduced after photographing, and then a correction pattern can be specified, including the execution or non-execution of image quality deterioration correction while verifying an image for each frame. In addition, when making an order to a lab, an order may be made by recording the information in an order form (customer card) or the like. Alternatively, the information of image quality deterioration correction may be specified and then an order may be made through a communication network such as Internet or the like.

In the case of the APS film, all the frames are normally photographed by one camera. However, since an APS camera may have a mid-roll change (MRC) function, if one APS film is photographed by a different camera by using the mid-roll change function of the APS camera, the information is recorded before/after the mid-roll change.

In the case of a camera whose lens is unchangeable such as a compact camera, a film with a lens (throwaway camera), a twin lens reflex camera, and a digital still camera, when a film or a recording medium is loaded onto the camera or taken out from the camera, it is preferable that information related to image quality deterioration such as image quality deterioration information and image quality deterioration correction information specified depending on the camera may be automatically recorded.

In the camera side, in addition to the above-mentioned information of image quality deterioration correction, at least one selected from focal length information, diaphragm information, lens type identification information, manufacturer identification information, camera type identification information, strobe information, image quality deterioration identification information and so on, had better similarly be recorded. For example, if strobe ON/OFF information or strobe information on a strobe illumination distribution characteristic, or the like has been recorded, then strobe illumination distribution can be corrected by the same method as that for reduced marginal illumination correction. Additionally, the image deterioration identification information is defined by any of predetermined various kinds of image quality deterioration level.

Figure 8:
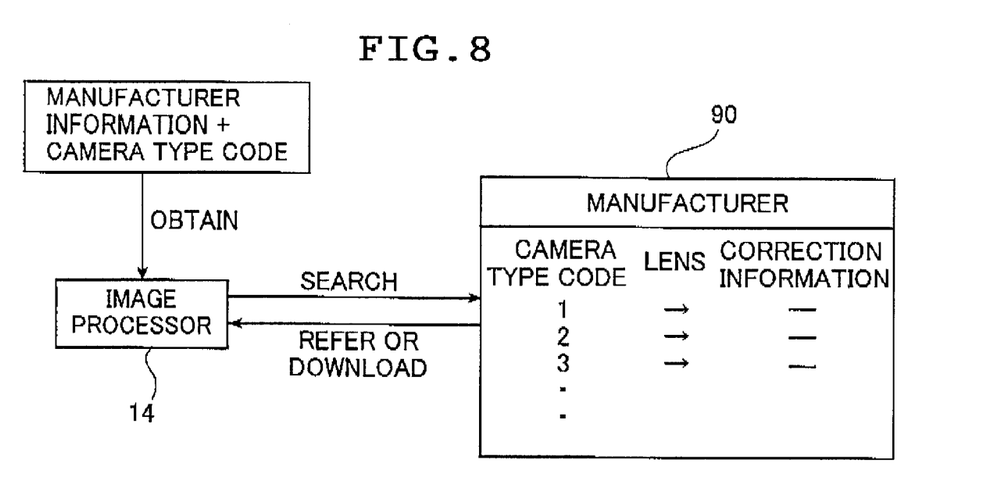
FIG. 8 is a view illustrating a state where the image forming system obtains information by way of a communication network.

If manufacturer identification information (manufacturer code, URL or the like) has been recorded, then as shown in FIG. 8, in the image processor 14 of the image forming system side, after this information has been obtained, access is made to manufacturer's server 90 through the communication network such as Internet, and correction processing is performed by referring to and downloading the information of image quality deterioration correction. Specifically, when correction is made by referring to the information of image quality deterioration correction, the referred information of image quality deterioration correction is not saved in the image forming apparatus side, and it is necessary to access the manufacturer's server 90 every time and to refer to the information of image quality deterioration correction. In addition, when correction is made by downloading the information of image quality deterioration correction, the downloaded information of image quality deterioration correction is saved in the image forming apparatus side. In this case, at the next time when image data photographed by the same camera is processed, correction can be made by using the saved information of image quality deterioration correction without accessing the manufacturer side. Needless to say, even when the information of image quality deterioration correction is downloaded, access may be made to the manufacturer's server 90 each time without saving the information.

Access may be made to the manufacturer's server 90 by using at least one selected from the camera identification information and the lens identification information in addition to the manufacturer identification information. As a result, precisely matched lens correction information can be obtained, and higher quality correction processing can be performed. Thus, even if the information of image quality deterioration correction does not exist, as long as manufacturer identification information, and/or camera identification information and lens identification information exist, correction can be made by obtaining the information of image quality deterioration correction from the manufacturer.

Thus, since it is only necessary for each camera manufacturer to support only the lens correction information of its own camera, a burden can be reduced, and manufacturer's own original services (content, template, advertisement, quality information, and so on) can accordingly be added. In the case of a factor enabling quality information to be added and correction to be made by image processing therein, a higher quality image can be obtained by executing image processing for correction.

Here, the content means extra prints, movies, or the like; and the template means a service for composing a proper comic character, a character or the like in a photographing frame. For the advertisement, a new product or a service may be printed in a surface or a back of the print or in a blank or the like of an index print in the case of print output. In the case of image data output, such contents may be outputted to a file.

In a lab, upon having an order of a print or the like, for example, if it is an order by a film, then the film is first scanned by the scanner 12, and an image is read. The image data read by the scanner 12 is sent to the image processor 14, and as described above, prescanned data and fine scanned data are respectively stored in the pre-scan memory 60 and the fine scan memory 62. In addition, the information of image quality deterioration correction recorded in an end part of a film F with a bar code is read together with photographing information by the bar-code reader 38, and sent through the CPU bus 80 to the CPU 54. Accordingly, by the CPU 54, one corresponding to the information of the image quality deterioration correction read from this film F is read out, among bits of image quality deterioration correction information held beforehand in the system to the internal memory 56, and then fed to the aberration correction unit 76.

If the information of image quality deterioration correction information is specified by a customer card at the time of ordering, an operator enters the information of image quality deterioration correction information from the keyboard 18a or the like. Simultaneously, the photographing information read by the bar-code reader 38 is sent to the image processing condition setting unit 82 of the condition setting unit 68.

In the condition setting unit 68, an image processing condition is set, image processing is thereby executed for the fine scanned data, the result is outputted as a finished print from the printer 16, or sent to the external memory 19, and outputted as image data therefrom to a predetermined recording medium.

In the CPU 54, as described above, the obtained information of image quality deterioration correction obtained from the film F matched with bits of image quality deterioration correction information held beforehand in the internal memory 56 in the image forming system side which has been obtained from the film F, and one corresponding to the former is called out, and fed to the aberration correction unit 76. In this case, however, the number of correction patterns supported in the image forming system side and the number of correction patterns to be specified at the camera side may be different from each other. Such a case is dealt with as follows.

Figure 9:
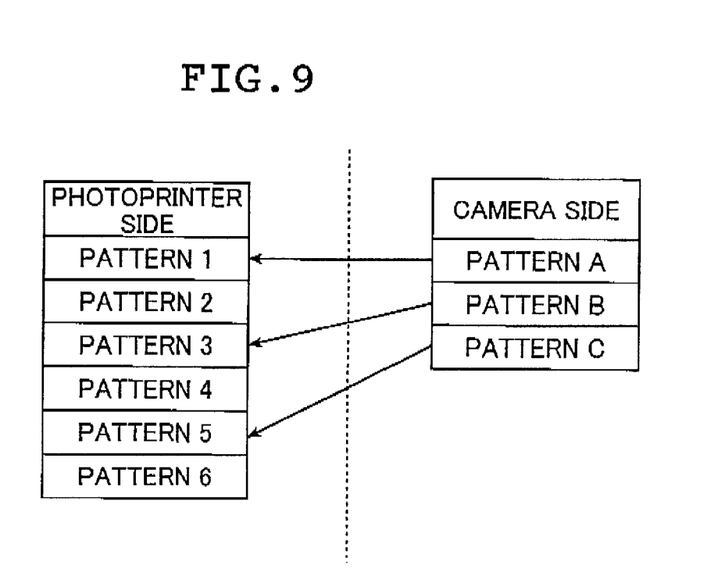
FIG. 9 is a view illustrating an example where the numbers of correction patterns supported respectively at the camera side and the image forming system side are different.

First, if the number of correction patterns held in the image forming system side is larger more than that at the camera side, as shown in FIG. 9, it is only necessary to allocate patterns in the image forming system side in such a manner that a pattern A specified at the camera side corresponds to a pattern 1 in the system side, a pattern B at the camera side corresponds to the pattern 3 in the system side, and so on.

Figure 10:
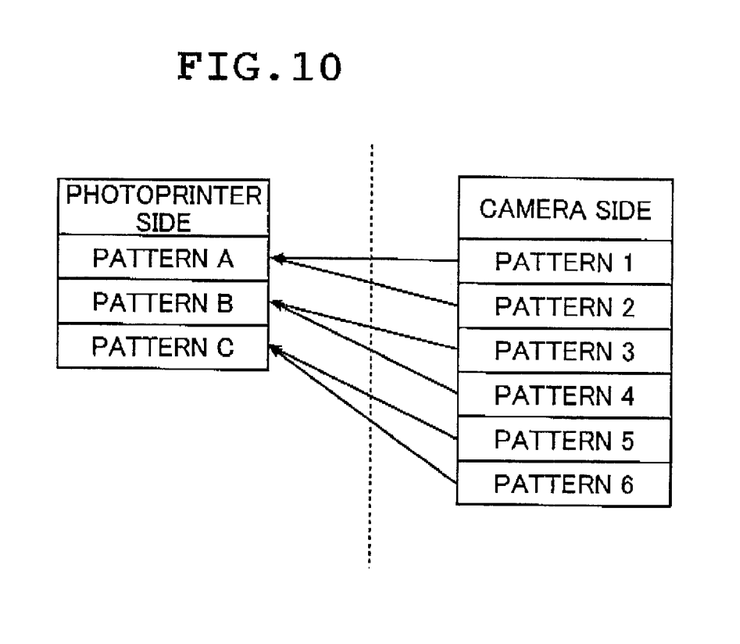
FIG. 10 is a view illustrating another example where the numbers of correction patterns supported respectively at the camera side and the image forming system side are different.

If the number of correction patterns to be specified at the camera side is larger than the number of correction patterns held in the image forming system side, as shown in FIG. 10, pattern allocation is made in relation to most similar one among patterns prepared in the system side, for example, in a manner that patterns 1 and 2 at the camera side correspond to a pattern A in the system side. In this case, however, performance may drop a little.

Figure 11:
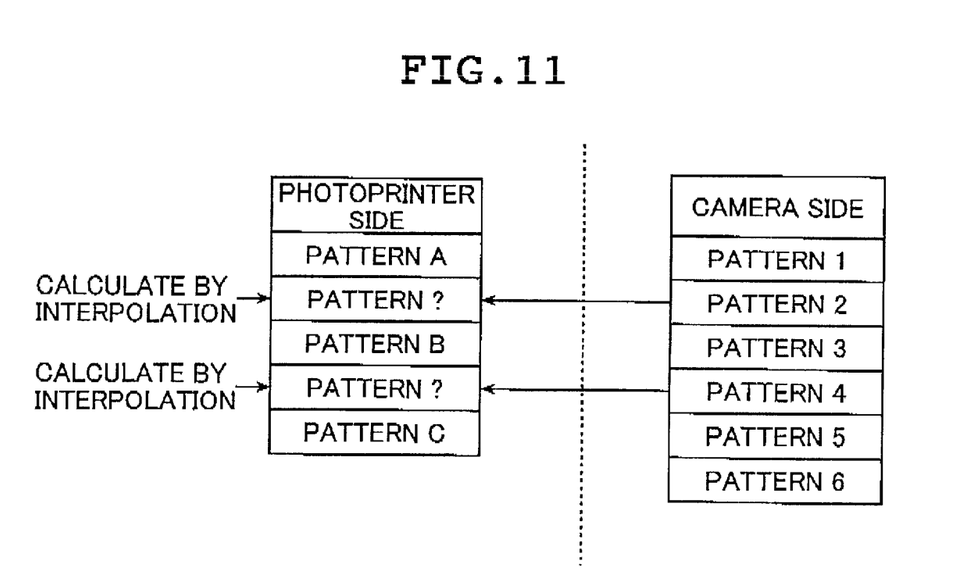
FIG. 11 is a view illustrating another example where the numbers of correction patterns supported respectively at the camera side and the image forming system side are different.

Thus, in this case, as shown in FIG. 11, an interpolation operation is performed by using image quality deterioration correction information of a correction pattern already existing in the image forming system side, and a new correction pattern is calculated. In this way, somewhat satisfactory performance can be obtained. In this case, timing for executing the interpolation operation is when the CPU 54 refers to correction patterns stored in the internal memory 56, and finds no corresponding correction pattern.

In the aberration correction unit 76, the magnification chromatic aberration and the distortion aberration of the image photographed on the film F by the image processing are corrected by using the information of image quality deterioration correction and the positional information of the image. As a result, it is possible to stably output a print, in which a high-quality image is reproduced without color shifting or distortion.

Next, processing performed in the aberration correction unit 76 will be described.

In the aberration correction unit 76, a proper position of each pixel is calculated from amounts of positional shifting of pixels R and B from pixels of the reference color (G) caused by magnification chromatic aberration, and an amount of positional shifting of the pixel of the reference color caused by distortion aberration, by using the information of image quality deterioration correction and the pixel position of the image data. Then, by using information on the calculated proper position of each pixel, the image data of each pixel is interpolated, and electronic variable power processing for the image is performed. That is, detection is made as to which position each pixel should originally be in by calculating the amounts of pixel positional shifting caused by the magnification chromatic aberration, and the distortion aberration, and electronic variable power processing is performed by executing the interpolation operation for the image data according to the proper position. Accordingly, by one interpolation operation, the correction of distortion aberration and magnification chromatic aberration, and electronic variable power processing can be performed.

In order to execute the foregoing method, the aberration correction unit 76 includes a coordinate conversion processing unit, and an expansion/reduction processing unit. When the image data is fed, in the coordinate conversion processing unit, by using the information of image quality deterioration correction, calculation is made as to the amounts of shifting Δr and Δb in the pixel positions ir and ib of R and B image data caused by magnification chromatic aberration with regard to G image data ig, and calculation is also made as to the amount of shifting D of the input image data ig of G caused by distortion aberration.

Then, by adding the Δr and the D to each pixel position ir of R input image data, a pixel position ir of the R image data in which the magnification chromatic and distortion aberrations are corrected is calculated. By adding the Δb and the D to each pixel position ib of B input image data, a pixel position ib of the B image data in which the magnification chromatic and distortion aberrations are corrected is calculated. By adding the D to each pixel position ig of G input image data, a pixel position ig of G image data in which the magnification chromatic and distortion aberrations are corrected is calculated. In the calculations, the magnification chromatic aberrations of the R and B images are corrected by using the G image as a reference, all the images are aligned with the G image, and by using the amount of shifting D of the G image caused by distortion aberration, all the distortion aberrations are corrected. Then, for each pixel of R, G and B, the pixel position in which the magnification chromatic and distortion aberrations are corrected is calculated.

Subsequently, in the expansion/reduction processing unit, by using the pixel positions ir, ig and ib in which the magnification chromatic and distortion aberrations are corrected, image variable power is performed by executing image data interpolation processing (interpolation by N times) according to expansion/reduction magnification, magnification chromatic and distortion aberrations are corrected, and the image data is outputted as one in which electronic variable power processing has been performed.

When distortion aberration is corrected, so-called eclipse occurs, in which an image in a reproducing area disappears. Thus, for correcting distortion aberration, preferably, electronic variable power processing (interpolation) should be performed by variable power rate higher by about 0.1 to 5% than that in a normal case. In such a case, each electronic variable power rate may also be set according to the information of image quality deterioration correction. In addition, since the amount of distortion aberration varies between the vertical and horizontal directions of the image, the variable power rate of electronic variable power processing may be accordingly changed between the vertical and horizontal directions.

In such a case, aberration correction processing such as magnification chromatic aberration and distortion aberration may be performed at the same time in both a vertical direction and a horizontal direction, i.e. in a two-dimensional processing manner. However, such a processing had better be performed separately in each of a vertical direction and a horizontal direction, i.e. in a one-dimensional processing manner.

The above-mentioned correction processing is executed according to the specified correction pattern, and in the described example, both distortion aberration and magnification chromatic aberration were corrected according to the preferred mode. However, only one of those aberrations may be specified to be corrected. In this case, aberration correction and electronic variable power processing are not performed separately. As in the case of the foregoing method, preferably, a proper position in which the amount of shifting caused by aberration is corrected is calculated, and electronic variable power processing is performed by interpolating the image data based on the information of the proper position. Further, correction processing may be performed not only for distortion and magnification chromatic aberrations but also for reduced marginal illumination or blur caused by the lens. The aberration corrected image data is subjected to sharpness processing, dodging and other necessary image processing at the block 75, and then sent to the image data conversion unit 78. In the describe example, the sharpness processing is executed after the aberration correction. However, aberration correction may be performed after completion of the sharpness processing. For an image quality, however, it is more advantageous to execute the sharpness processing after aberration correction as in the embodiment.

Additionally, as above-mentioned, image deterioration correction processing like this such as magnification chromatic aberration and distortion aberration may be performed at the same time in both a horizontal direction and a vertical direction, i.e. in a two-dimensional processing manner. However, such a processing had better be performed separately in each of X-direction and Y-direction, i.e. in a one-dimensional processing manner.

The above-mentioned correction processing is performed based on the specified information of image quality deterioration correction. However, a processing advantage can be increased more by performing fine adjustment according to instruction or the like from an operator.

In the image data conversion unit 78, the image data is converted into image data corresponding to image recording by the printer 16, and then sent to the same. In the printer 16, a photosensitive material (printing paper) is exposed according to the image data to record a latent image. Then, development processing is executed according to the photosensitive material, and a (finished) print is outputted.

Moreover, it necessary, the image data after image processing including aberration correction, and so on, is directly outputted to the external memory 19, and from here, it may be outputted to each of various recording media such as a smart medium, a compact flash, a PC card, a memory stick, a multimedia card, and so on.

As described above in detail, according to the embodiment of the invention, basically, the representative correction patterns are held beforehand in the image forming system side, and one is selected and specified from these patterns at the camera side. Further, if one specified by the camera side does not exist in the system side, then most similar one is substituted, or interpolation is made from similar one, thus calculating correction information. Thus, it is possible to deal with an enormous number of cameras made commercially available one after another. Since it is necessary to store only the representative information of image quality deterioration correction, only a small storage capacity is needed. The amount of information recorded at the camera side is also small, e.g., only pattern numbers. For developing a camera, optimal correction can be obtained by designing a lens based on the representative information of image quality deterioration correction (lens correction information) of the correction pattern prepared beforehand in the system. Moreover, by combining the photographing device (camera) and the image forming system, it is possible to obtain a much higher quality image, thus increasing the attractiveness of the camera.

The camera and the image forming system of the invention have been described in detail. It should be understood, however, that the invention is not limited to the foregoing embodiment, and various improvements and changes can be made without departing from the scope of the present invention.

As apparent from the foregoing, the present invention is advantageous in that it is possible to deal with an enormous number of cameras commercially made available one after another, only a small storage capacity is needed by storing only the representative information of image quality deterioration correction at the system side, and the amount of information to be recorded at the camera side is also small.

What is claimed is:

1. A camera for recording information related to deterioration of image quality used for image processing of a photographed image in at least one selected from a photographic film, a film cartridge and a recording medium, comprising:
    an information specifying unit which specifies image quality deterioration correction information for correcting image quality deterioration of said photographed image caused by a photographic lens of said camera; and
    an information recording unit which records said image quality deterioration correction information, or said image quality deterioration correction information and photographing information as related information.

2. A camera according to claim 1, wherein said image quality deterioration is at least one of magnification chromatic aberration, distortion aberration, reduced marginal illumination, blur and wide angle distortion.

3. A camera according to claim 1, wherein said image quality deterioration correction information is at least one of magnification chromatic aberration correction information, distortion aberration correction information, reduced marginal illumination correction information, blur correction information and wide angle distortion correction information.

4. A camera according to claim 1, wherein said photographing information is at least one of focal length information, diaphragm information, lens type identification information, manufacturer identification information, camera type identification information, strobe information and image deterioration identification information.

5. A camera according to claim 1, wherein said information recording unit records said image quality deterioration correction information, or said image quality deterioration correction information and said photographing information when fabricating loading or unloading said photographic film, said film cartridge or said recording medium into said camera or from said camera, photographing an image or before/after photographing said image.

6. A camera according to claim 1, wherein said information specification unit selects and specifies said image quality deterioration correction information from among pieces of information prepared beforehand, and records said specified information.

7. A camera according to claim 1, wherein said information specification unit can select and specify all of a plurality of contents of said correction as a set, or each of said plurality of contents of said correction, regarding as said image quality deterioration correction information.

8. A camera according to claim 1, wherein said information specification unit can select and specify said image quality deterioration correction information, as a set of said photographed image in a vertical direction and that in a horizontal direction, or separately select and specify each of that in said vertical direction and that in said horizontal direction of said photographed image.

9. A camera according to claim 1, said information specification unit selecting and specifying said image quality deterioration correction information from among pieces of information prepared beforehand, and recording said specified information, wherein a plurality of selection objects representing a plurality of deterioration correction contents regarding as said image quality deterioration correction information to be selected by said information specification unit are recorded on said photographic film, said film cartridge or said recording medium when fabricating said camera and at least one of said plurality of selection objects is selected and recorded when photographing.

10. An image forming system for reading information related to image quality deterioration used for image processing of a photographed image of a camera which is recorded in at least one of a photographic film, a film cartridge and a recording medium by said camera, and performing said image processing using said read information, and forming a reproduced image of said photographed image, said system comprising the steps of:
    reading image deterioration correction information for correcting said image quality deterioration of said photographed image caused by a photographic lens of said camera recorded as said related information by said camera from at least one of said photographic film, said film cartridge, and said recording medium, or said image deterioration correction information and a photographing information;

correcting said image quality deterioration based on said image deterioration correction information, or said image deterioration correction information and said photographing information; and forming said reproduced image.

11. An image forming system according to claim 10, wherein said image quality deterioration is at least one of magnification chromatic aberration, distortion aberration, reduced marginal illumination, blur, and wide angle distortion.

12. An image forming system according to claim 10, wherein said information of image quality deterioration correction is for performing at least one of magnification chromatic aberration correction, distortion aberration correction, reduced marginal illumination correction, blur correction, and wide angle distortion correction.

13. An image forming system according to claim 10, wherein said photographing information is at least one of information of a focal length, information of a diaphragm, information of identifying a kind of lens, information of identifying manufacturer, information of identifying a kind of camera, information of a strobe, and information of identifying image quality deterioration.

14. An image forming system according to claim 10, wherein said information of image quality deterioration correction is prepared beforehand for each of all photographing conditions.

15. An image forming system according to claim 10, wherein a plurality of patterns are prepared beforehand for said information of image quality deterioration correction, and said image quality deterioration is corrected using information selected and specified from among said plurality of patterns.

16. An image forming system according to claim 10, wherein a plurality of patterns are prepared beforehand for said information of image quality deterioration correction, and said image quality deterioration is corrected using information selected and specified from among said plurality of patterns, in which said information of image quality deterioration correction to be prepared beforehand is information of image quality deterioration correction under a representative photographing condition.

17. An image forming system according to claim 10, wherein a plurality of patterns are prepared beforehand for said information of image quality deterioration correction, and said image quality deterioration is corrected using information selected and specified from among said plurality of patterns, in which said information of image quality deterioration correction to be prepared beforehand is information of image quality deterioration correction under a representative photographing condition and in which under a photographing condition other than said representative photographing condition, correction is performed by interpolation from said information of image quality deterioration correction under said representative photographing condition or conditions, and by calculating new information of image quality deterioration correction.

18. An image forming system according to claim 10, wherein a plurality of patterns are prepared beforehand for said information of image quality deterioration correction, and said image quality deterioration is corrected using information selected and specified from among said plurality of patterns, in which wherein said information of image quality deterioration correction for which the plurality of patterns are prepared beforehand, is fine-adjusted.

19. An image forming system according to claim 10, wherein said information of image quality deterioration correction is prepared beforehand for each of all photographing conditions, in which said each of all photographing conditions is defined by at least one of information of a diaphragm, information of a focal length, and information of a strobe.

20. An image forming system according to claim 10, wherein said information of image quality deterioration correction is prepared beforehand for each of all photographing conditions, in which correction of said image quality deterioration of said photographed image caused by said photographic lens is performed by each of contents of said correction as a set, or separately performed by each of contents of said correction.

21. An image forming system according to claim 10, wherein correction of said image quality deterioration of said photographed image caused by said photographic lens is performed as a set of said photographed image in a vertical direction and that in a horizontal direction, or separately select and specify each of that in said vertical direction and that in said horizontal direction of said photographed image.

22. An image forming system according to claim 10, wherein said related information of said information of image quality deterioration correction is managed on a network, and downloaded or read by way of said network, in which correction of said image quality deterioration caused by said photographic lens is performed based on said related information which has been downloaded and read.

23. An image forming system according to claim 10, wherein said related information of said information of image quality deterioration correction is managed on a network, and downloaded or read by way of said network, in which correction of said image quality deterioration caused by said photographic lens is performed based on said related information which has been downloaded and read, and in which said information of image quality deterioration correction is managed by a manufacturer's server, access is made to said manufacturer's server by way of said network using the manufacturer identification information, thereafter said related information is read and downloaded to perform correction of said image quality deterioration caused by said photographic lens based on said related information which has been downloaded or read.

24. An image forming system according to claim 10, wherein after completion of said correction of image quality deterioration caused by said photographic lens, at least one selected from print outputting and image data outputting is performed.

25. An image forming system according to claim 10, wherein said camera is for recording said information related to deterioration of image used for the image processing in at least one selected from the photographic film, the film cartridge and the recording medium, comprising:

an information specifying unit which specifies said image quality deterioration correction information for correcting said image quality deterioration, and an information recording unit which records said image quality deterioration correction information, or said image quality deterioration correction information and said photographing information as said related information.

* * * * *